United States Patent Office 3,161,246
Patented Dec. 15, 1964

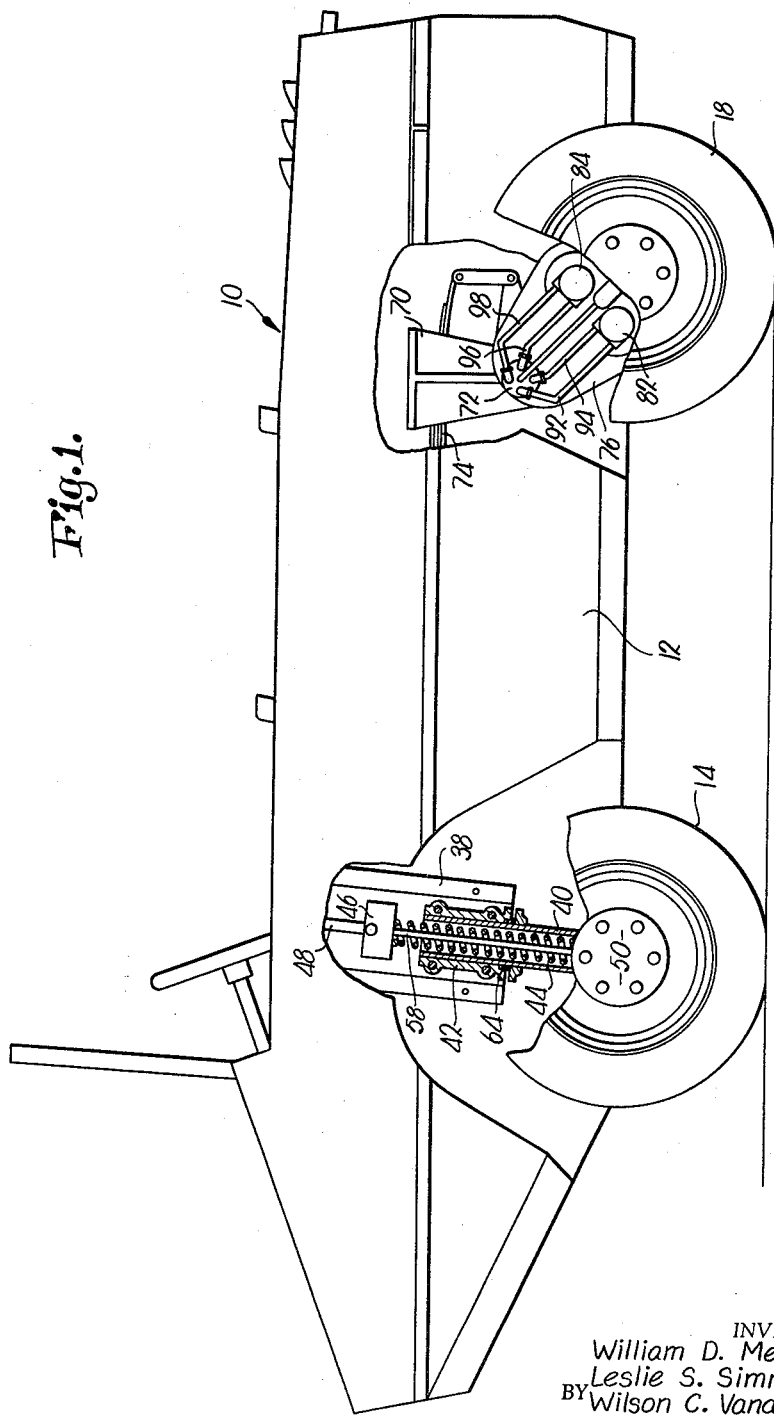

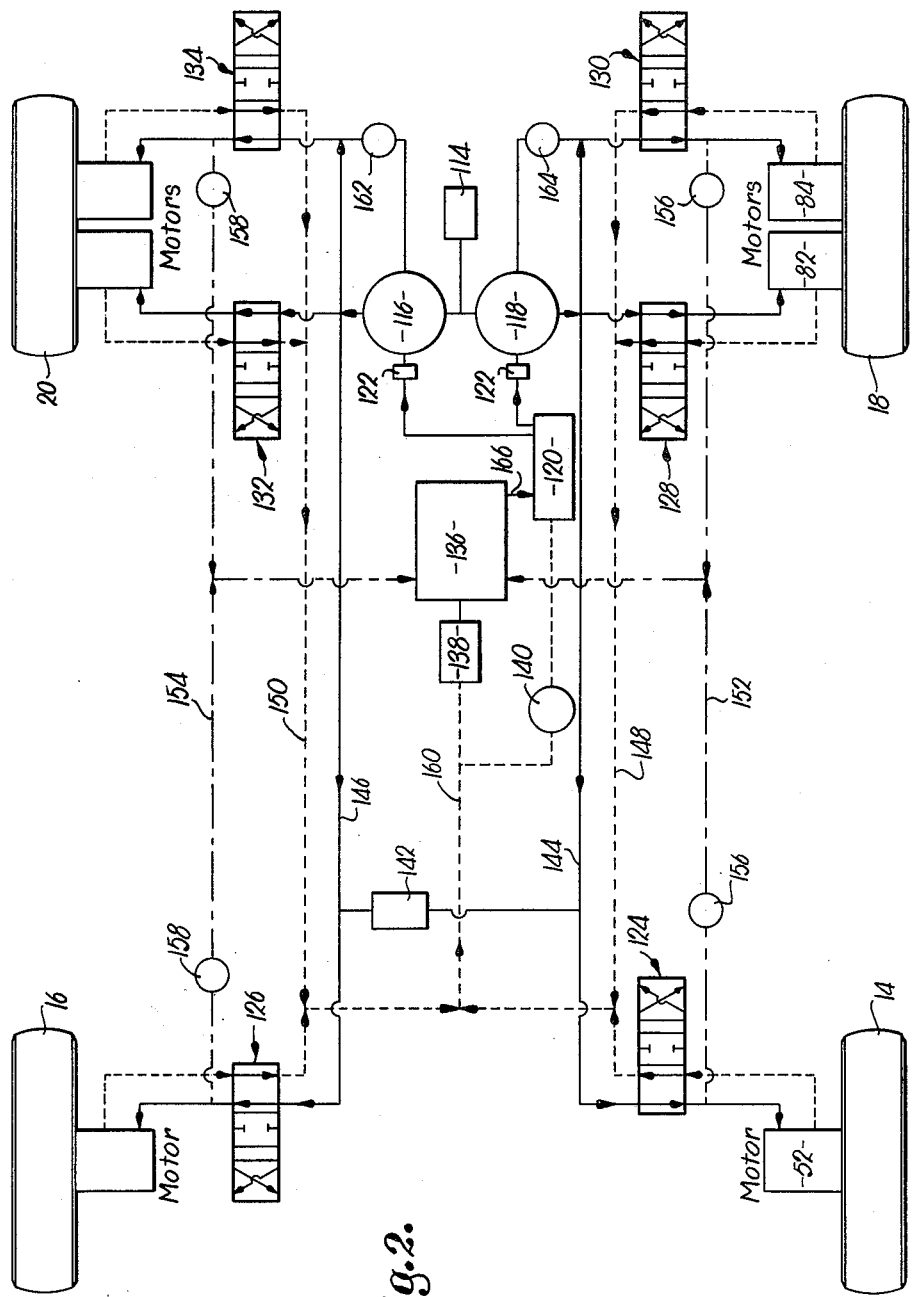

3,161,246
DRIVING AND SUSPENSION SYSTEM FOR AMPHIBIOUS VEHICLE
William D. Meeker, Leslie S. Simmons, and Wilson C. Vanderslice, Kansas City, Mo., assignors to Product Development Corporation, Kansas City, Mo., a corporation of Missouri
Filed July 16, 1962, Ser. No. 210,086
5 Claims. (Cl. 180—6.48)

This invention relates to a vehicle adapted to travel on both land and water, and more particularly, to a hydraulic driving system for such a vehicle.

It is the primary object of this invention to provide a hydraulic driving system for a vehicle which includes a pair of hydraulic motors carried at the front of the vehicle, there being a single motor used to drive each front wheel; and two pairs of hydraulic motors disposed rearwardly of the vehicle, each pair being coupled to one of the rear wheels and being selectively adaptable to drive their corresponding wheels.

Yet another aim of this invention is to provide a suspension system for vehicles, which suspension system has means as a part thereof for supporting and suitably carrying the hydraulic motor or motors for each wheel of the vehicle, and which suspension system is designed in such a manner to cooperate with the components of the hydraulic driving system, thereby utilizing a minimum amount of space adjacent each wheel of the vehicle.

Yet another object of this invention is to provide a suspension system for the front wheels of a vehicle which includes a spring-carrying tube, the tube having one end thereof coupled to the vehicle and the opposite end thereof carrying an axle assembly as well as a hydraulic motor, there being a coil spring disposed interiorly of the tube and a bearing telescopically receiving the tube, whereby reciprocating movement of the latter is permitted, the fluid tubes for the hydraulic motor being disposed interiorly of the spring-carrying tube and extending longitudinally of the spring at the center thereof.

A yet further aim of this invention is to provide a suspension system for the rear wheels of such a vehicle which includes a sleeve pivotally carried by hangers secured to the body, which sleeve has suspended therefrom a wheel and axle assembly, as well as a driving assembly for said wheel and axle assembly, the fluid tubes for the hydraulic motor of the driving assembly having a stretch thereof disposed interiorly of the sleeve and extending axially thereof.

Yet another aim of this invention is to provide a hydraulic driving system for vehicles which utilizes a pair of pumps to circulate fluid within a pair of hydraulic circuits, there being such a circuit for each side of the vehicle whereby fluid may be delivered to the hydraulic motor at each wheel of the vehicle, there being valves interposed in the hydraulic circuits whereby actuation of each of the hydraulic motors at the wheels of the vehicle may be selectively controlled.

Other objects of this invention include the details of construction of the suspension assembly; like details of the hydraulic driving system; and other structural characteristics which will become apparent from the following specification and accompanying drawings, wherein:

FIGURE 1 is a side elevational view of the vehicle, portions being broken away and in section to reveal details of construction;

FIG. 2 is a diagrammatical plan view showing the manner in which the hydraulic circuits and the components thereof are disposed relative to the vehicle.

This invention relates to a vehicle, designated as 10, and intended to operate on both land and in the water, which vehicle 10 has a body 12 of substantially conventional construction in that there is provided a suitable chassis and body panel members which serve to define the vehicle 10.

The vehicle 10 is provided with a pair of front wheels 14 and 16 respectively, and a pair of rear wheels 18 and 20 respectively. The front wheels 14 and 16, and the suspension systems therefor, as well as the driving systems therefor, are identical in construction and thus only one of said wheels and the driving and suspension system therefor will be described in detail hereinafter. Likewise, the suspension systems of each of the rear wheels 18 and 20, as well as the driving systems for each of said wheels, are identical and thus only one of the rear wheel assemblies will be described in detail.

The front wheel suspension and driving systems are best illustrated in FIG. 1 of the drawings. Referring to FIG. 1, there is a frame support 38 forming a part of vehicle 10 and disposed interiorly of body wall 12, which frame support 38 carries a tube 40, the tube 40 being received within a bearing 42 whereby said tube 40 may reciprocate in a substantially vertical path with respect to the body 12 of the vehicle, it being appreciated that bearing 42 is suitably carried by the frame of the verhicle 10 and telescopically receives tube 40 whereby to allow reciprocable motion of said tube 40.

A coil spring 44 is carried interiorly of tube 40, and the normally uppermost end of spring 44 rests upon a plate 46 coupled to a pair of compression rods 48 which are connected to frame support 38 at the end thereof opposite to that secured to plate 46.

The lowermost end of tube 40 is coupled to a motor and axle assembly broadly designated as 50, said assembly including a hydraulic motor 52, an axle, and a wheel such as 14. The motor 52 is a hydraulic motor and is operated by means of fluid delivery and return tubes which extend longitudinally of tube 40 and pass through the center of spring 44, one of the tubes 58 being shown in FIG. 1 and the other of said tubes being disposed rearwardly of tube 58. The motor 52 directly drives a shaft which is suitably coupled with the axle of assembly 50, whereby, upon delivery of fluid to the motor 52, the wheel 14 will be driven.

All of the components of the motor and axle assembly 50 are suitably encased within a waterproof housing, and a seal designated as 64 is provided between the body 12 and the bearing 42 which carries the tube 40. Thus, a single seal 64 is all that is necessary for each of the front wheels 14 and 16.

The suspension and driving assemblies for the rear wheels 18 and 20 are best shown in FIG. 1 of the drawings and, as above mentioned, are identical in construction and operation. Each assembly includes a pair of hangers 70 which support a sleeve 72 in such a manner that sleeve 72 may pivot with respect to the hangers 70, sleeve 72 being coupled with a spring assembly 74 whereby to allow shifting movement thereof. The hangers 70 are coupled with the frame of the vehicle and are disposed, for the most part, within the confines of body 12 of the vehicle. A plate 76 depends from sleeve 72 exteriorly of body 12 and carries the driving assembly for a corresponding rear wheel such as 18. The depending plate 76 carries a pair of hydraulic motors 82 and 84. The motors 82 and 84 are supplied with fluid by delivery and return lines 92 and 94 and 96 and 98 respectively, which lines have a stretch thereof passing through sleeve 72 axially and longitudinally thereof, and thence downwardly to a point of connection with their corresponding motors.

The diagrammatic view of FIG. 2 illustrates the manner in which the components of the hydraulic driving system are disposed relative to the vehicle, and also the manner in which fluid is delivered to the hydraulic motors for the front and rear wheels of the vehicle.

There is provided a gasoline engine 114 which operates a pair of pumps 116 and 118, which pumps are suitably coupled to a source of hydraulic fluid such as a reservoir 120 whereby to draw fluid from reservoir 120 through filters such as 122 provided for each of the pumps 116 and 118, and thus deliver the fluid to the corresponding circuit coupled with each of the respective pumps 116 and 118.

Each of the six hydraulic motors of the vehicle has disposed adjacent thereto and interposed within the fluid delivery and return lines therefor, a valve which controls the flow of fluid to and from a given motor, the valves for the front motors being designated as 124 in the case of motor driving wheel 14, and as 126 in the case of the motor driving wheel 16. The valves for the rear motors are designated as 128 and 130 in the case of the motors driving rear wheel 18, and as 132 and 134 in the case of the motors driving rear wheel 20. Said valves 124–134 are diagrammatically shown in FIG. 2 of the drawings, are identical in construction, and take the form of a normal three-position type fluid valve.

A sump and heat exchanger 136 forms a part of the hydraulic system as does a braking valve 138, a brake make-up pump 140, and a cutoff valve 142. The fluid is delivered to the motors operating wheels 14 and 18 on one side of the vehicle by a high pressure delivery line designated broadly as 144 and shown as a solid line in FIG. 2. The corresponding delivery line for the motors driving wheels 16 and 20 on the opposite side of the vehicle is also shown as a solid line and is designated as 146. The return line for motors driving wheels 14 and 18 is shown as a dashed line and is designated as 148, the return line for the motors driving wheels 16 and 20 being also shown in dashed lines and designated as 150. A surge check line 152 shown as a broken line, is provided for the hydraulic circuit serving wheels 14 and 18, and a similar surge check line 154 is provided for the hydraulic circuit serving wheels 16 and 20. The surge check line 152 has a pair of check valves 156 interposed therein, there being a check valve adjacent each wheel 14 and 18. Likewise, the surge check line 154 has a pair of check valves 158 interposed therewithin, there being a valve corresponding to each of wheels 16 and 20.

To initially place the vehicle 10 in operation, gasoline engine 114 is actuated, thereby placing in operation pumps 116 and 118, the pump 116 serving to draw fluid from reservoir 120 and circulate the same through supply line 146 to the motors serving wheels 16 and 20, this fluid being returned by means of return line 150 to the sump and heat exchanger 136. In a similar manner, pump 118 draws fluid from reservoir 120 and supplies the same to the motors serving wheels 14 and 18 through supply line 144, the fluid then being returned to sump 136 through return line 148. It will be noted that return lines 148 and 150 join, prior to entering sump and heat exchanger 136, the common stretch thereof being designated as 160, the braking valve 138 being interposed within said common stretch 160. When said pumps 116 and 118 are placed in operation as above described, the pressure within each of the circuits is appropriately controlled as by pressure relief valves 162 and 164, valve 162 being interposed within the circuit serving wheels 16 and 20, and valve 164 being interposed within the circuit serving wheels 14 and 18.

When the motor 114 and thus, pumps 116 and 118, are initially actuated as above described, the valves 124–134 are shifted to their fully open positions are schematically illustrated in FIG. 2 of the drawings, and with said valves 124–134 in this position, fluid is being delivered to each of the driving motors of the vehicle and is being returned as above described whereby complete circulation within the hydraulic driving system of the vehicle is created.

To move the vehicle 10 forwardly, the speed of gasoline engine 114 is increased, thereby increasing the rate of flow of fluid through delivery lines 144 and 146 and the corresponding motors served thereby, whereby to drive wheels 14, 16, 18 and 20 simultaneously, wheels 14 and 16 each being driven by a single motor, and wheels 18 and 20 each being driven by a pair of motors.

To shift the vehicle into its next speed range, the two hydraulic motors operating the front wheels 14 and 16, are cut off or placed into a neutral position by placing valves 124 and 126 in a position whereby the delivery of fluid under pressure to the motors served by said valve, is eliminated. When this is done, it is necessary, for lubrication purposes, to continue the flow of fluid to the motors of the front wheels, this being accomplished by surge check lines 152 and 154 and their corresponding check valves 156 and 158, whereby there is a low pressure delivery of fluid to the motors serving wheels 14 and 16 to insure the continued lubrication thereof for protective purposes and also, for use in braking as may be necessary.

With the valves 124 and 126 in the position above described, valves 128–134, which serve the rear wheels 18 and 20, are still in their fully open positions and, therefore, each of the rear wheels 18 and 20 is being driven by two hydraulic motors. Thus, by increasing the speed of gasoline engine 114 the flow of fluid to the said four motors which are driving wheels 18 and 20, may be increased and thereby the speed of the vehicle 10, increased.

When it is desired to shift into the next speed ratio of the vehicle, valves 130 and 134 are placed in their neutral positions and rear wheels 18 and 20 are then each driven by only one hydraulic motor, this being the motor corresponding to valve 128 in the case of wheel 18 and the motor corresponding to valve 132 in the case of wheel 20.

When valves 130 and 134 are placed in their neutral positions it is necessary to deliver fluid to the hydraulic motors normally coupled with said valves, and this continued flow of fluid for lubricating and braking purposes is accomplished by surge check lines 152 and 154 which are coupled to the motors normally served by valves 130 and 134.

It will be appreciated that rear wheels 18 and 20 are now each being driven by a single hydraulic motor, the fluid for such motors passing through valves 128 and 132 respectively. In this regard, it is to be preferred that the hydraulic motors which serve wheels 18 and 20, be of different sizes, that is each pair of motors driving said wheels should include a larger motor and a smaller motor, the smaller of the two motors being served by valves 128 and 132 and serving to drive the rear wheels in what might be described as "high gear."

If it is desired to brake the vehicle, the valve 138, which is interposed in the common return line 160, is throttled to a closed position whereby to build up the pressure in return lines 148 and 150, the reverse pressure in said return lines also being increased by means of brake make-up pump 140 whereby the flow of fluid to each of the motors is reversed and a progressive baking action achieved through such reverse flow. As is apparent from FIG. 2 of the drawings, the normal flow of hydraulic fluid throughout the circulation system of the vehicle, is continuous, it being contemplated that after the fluid is returned from the motors through lines 148 and 150, and common stretch thereof 160, it will be delivered to the sump and heat exchanger 136 whereby it is cooled prior to passing through a line 166 back into reservoir 120 whereby it may be drawn therefrom by pumps 116 and 118 and continuously circulated within the hydraulic system above described.

It will be further noted that cutoff valve 142 provides for independent operation of the wheels driven by pump 116, or those driven by pump 118, and that, through suitable actuation of said valve, the wheels on one side of the vehicle may be driven by a full pressure independent of the pressure delivered to the motors serving the wheels of the other side of the vehicle. Thus, through utilization of cutoff valve 142, as well as valves 124–134, the wheels on either side of the vehicle may be independently operated as a pair, or any one given wheel of the vehicle may be driven in independent fashion.

If it is desired to reverse the direction of the vehicle 10, the valves 124–134 are shifted to their reverse or cross-flow positions whereby the flow of fluid is reversed and the entire operation above described, reversed to thereby move the vehicle rearwardly as opposed to its normal path of travel, the creation of which is above described.

Thus, it will be seen that there is provided a vehicle which can be operated on both land and water and which has a novel hydraulic driving system, as well as a suspension system which is integrated with the driving system and which vehicle is highly maneuverable due to the flexibility inherent in the driving system provided therefor.

Having thus described the invention, what is claimed as new and desired to be secured by Letters Patent is:

1. A driving system for a vehicle having a body supported by a pair of front wheels and a pair of rear wheels; an hydraulic motor coupled to each of said front wheels; a pair of hydraulic motors coupled to each of said rear wheels; a first hydraulic circuit for supplying fluid to the motors on one side of the vehicle; a second hydraulic circuit for supplying fluid to the motors on the other side of said vehicle; a pump for each of said circuits; valves interposed in each circuit between the pump therefor and the motors thereof whereby to allow selective, independent control of the speed of each motor of each circuit; a return line for each circuit; a heat exchanger for receiving fluid from said circuits through said return lines, said return lines entering the heat exchanger through a common line; valve means interposed in said common line whereby to throttle the flow of fluid therein and thereby brake said vehicle; and a supplemental pump coupled with said common line for increasing the fluid pressure therein.

2. A driving system for a vehicle as set forth in claim 1, there being a line placing said first circuit in communication with said second circuit; and a valve interposed in said line whereby said circuits may be selectively placed in communication.

3. A driving system for a vehicle as set forth in claim 2, there being a fluid surge check line interconnecting the motor on the front wheel and one of the motors on the rear wheel served by said first circuit; and a fluid surge check line interconnecting the motor on the front wheel and one of the motors on the rear wheel served by said second circuit.

4. A driving system as set forth in claim 3, each of said surge check lines having valves therein corresponding to each of the motors to which the line is connected.

5. A driving system as set forth in claim 4, the motors of the pair for each rear wheel being of different sizes.

References Cited by the Examiner
UNITED STATES PATENTS

| | | | |
|---|---|---|---|
| 1,803,932 | 5/31 | Dooley | 180—66 |
| 1,987,698 | 1/35 | Montelius | 180—66 X |
| 2,257,108 | 9/41 | Cornwell | 180—6.48 |
| 2,330,565 | 9/43 | Eckart. | |
| 2,399,141 | 4/46 | Quinn | 115—1 |
| 2,534,575 | 12/50 | Conley et al. | 267—60 X |
| 2,599,450 | 6/52 | Henning. | |
| 2,656,152 | 10/53 | Moon | 180—66 X |
| 2,662,236 | 12/53 | Kester | 9—1 X |
| 2,678,106 | 5/54 | Vonderheide | 180—66 |
| 2,720,274 | 10/55 | Blomquist | 180—60 |
| 3,024,858 | 3/62 | Davis | 180—66 X |
| 3,057,319 | 10/62 | Wagner | 115—1 |
| 3,091,930 | 6/63 | Thoma et al. | 180—66 X |

FOREIGN PATENTS 278,175   1/52   Switzerland.

A. HARRY LEVY, *Primary Examiner.*

PHILIP ARNOLD, *Examiner.*